United States Patent
Taylor

(10) Patent No.: US 6,586,557 B2
(45) Date of Patent: Jul. 1, 2003

(54) USE OF TRIAZONE MATERIALS IN FIBERGLASS BINDERS

(75) Inventor: Thomas J. Taylor, Englewood, CO (US)

(73) Assignee: Johns Manville International, Inc., Denver, CO (US)

( * ) Notice: Subject to any disclaimer, the term of this patent is extended or adjusted under 35 U.S.C. 154(b) by 0 days.

(21) Appl. No.: 09/867,953

(22) Filed: May 30, 2001

(65) Prior Publication Data

US 2003/0032762 A1 Feb. 13, 2003

Related U.S. Application Data

(60) Provisional application No. 60/279,527, filed on Mar. 28, 2001, provisional application No. 60/256,947, filed on Dec. 21, 2000, and provisional application No. 60/243,749, filed on Oct. 30, 2000.

(51) Int. Cl.[7] .................. C08G 12/06; C08G 12/12; C08G 12/34; C08G 12/36

(52) U.S. Cl. .................. 528/230; 528/256; 528/259; 528/261; 528/266; 528/269; 528/86

(58) Field of Search ................ 528/230, 256, 528/259, 261, 266, 269, 86

(56) References Cited

U.S. PATENT DOCUMENTS 6,114,491 A * 9/2000 Dupre et al. ................ 528/129

* cited by examiner

*Primary Examiner*—Duc Truong
(74) *Attorney, Agent, or Firm*—Robert D. Touslee

(57) ABSTRACT

Provided is an improved binder for use of fiberglass insulations and glass mats. The fiberglass binder is a triazone material prepared from urea, formaldehyde and a primary amine or a mixture of a priamary amine and ammonia. The binder of the present invention provides an increase in nitrogen content, while lowering the costs of manufacturer and improving performance. The binders of the present invention also exhibit lowered emissions and excellent high temperature properties.

11 Claims, No Drawings

USE OF TRIAZONE MATERIALS IN FIBERGLASS BINDERS

This application is related and claims priority under 35 U.S.C. §119 to U.S. Provisional Application Ser. No. 60/243,749, filed Oct. 30, 2000, No. 60/256,947, filed Dec. 21, 2000, and No. 60/279,527, filed Mar. 28, 2001 the entire contents of each of which are incorporated by reference herein.

BACKGROUND OF THE INVENTION

The present invention relates to the use of triazone materials in fiberglass binders, and in particular in fiberglass binders for high temperature applications. The triazone materials of the present invention utilize particular mole ratios of reactants to provide improved performance in binders, and to provide a more cost effective binder material.

DESCRIPTION OF THE RELATED ART

Resins for the fiberglass industry are traditionally based on water soluble phenol-formaldehyde resole resins. These water soluble materials are prepared with high initial formaldehyde to phenol ratios in the resin manufacturing process. The typical formaldehyde:phenol ratios used to prepare such resins are in the range of 2.5:1 to 4:1. The finished phenolic resins used by the fiberglass industry have between 3 and 13% free formaldehyde remaining. By adding urea to the resins about 6 to 18 hours before use, a urea/formadehyde resin is essentially made in situ (this process is known as pre-reaction). This reduces the formaldehyde content and significantly lowers the cost of the finished binder. Depending on the free formaldehyde in the resin, the resin to urea ratio is typically between 90/10 and 60/40 (solids basis). These systems are usually referred to as urea extended phenol/formaldehyde binders.

The urea extended phenol formaldehyde binders are not ideal for high temperature applications. At elevated temperatures these binders tend to exothermically decompose. This process is known as "punking" and is associated with exothermic heat release sufficient to damage the fiberglass fibers. The latter may be exhibited as a melting of the fibers or sintering of the fibers together to form a dense mass. Resistance to punking can be increased by adding more urea, but then other properties such as product rigidity may suffer. Frequently melamine formaldehyde resins are added to the binder to improve resistance to punking. Melamine resins are stable to higher temperatures than either PF or UF systems. As with urea, they release nitrogen and nitrogenous compounds upon thermal decomposition. Due to the high temperature breakdown of melamine coating this release is thought to dampen the exothermic degradation of the entire binder system. Melamine breaks down at higher temperatures than urea, and so nitrogen release from melamine is thought to coincide more with punking than that from urea. In other words, melamine is more efficient at preventing punking than urea. However, melamine resins tend to emit significant quantities of formaldehyde during cure, and they are expensive.

For glass mats, used in a variety of applications, there is also a desire to obtain good high temperature resistance. As with fiberglass insulation, glass mat binders typically incorporate melamine resin to improve high temperature resistance.

Fiberglass pipe insulation is one such application in which good high temperature resistance is important. For fiberglass pipe insulation it is often desirable to be able to apply the insulation to hot pipes. These may be at temperatures of up to 950° F. or higher. For this reason, the pipe insulation binder must not be significantly exothermic as it thermally degrades. If it is exothermic upon degradation, then the glass fiber could melt and shrink away from the pipe, thereby reducing the insulation performance. The fiberglass industry strongly desires a way of lowering the cost of pipe insulation binders, such that manufacturing emissions may also be lowered, but wherein product performance does not suffer.

Generally, given the large volume of fiberglass and glass mat resins used commercially, and the need to improve high temperature performance, there is a continuing need to lower costs and further improve performance. U.S. Pat. No. 6,114,491 discloses the use of cyclic urea-formaldehyde prepolymers in phenol-formaldehyde and melamine-formaldehyde binders. The binders are intended for use in a wide range of articles including fiberglass insulation. The cyclic urea-formaldehyde prepolymers are formed from the reaction of urea, formaldehyde, and ammonia or a primary amine. Such prepolymers consist of substituted triazone materials. The examples shown in U.S. Pat. No. 6,114,491 all result in a conversion of urea to triazone of no more than about 80%. The remaining urea may be reacted onto the triazone ring or it may be present as a urea-formaldehyde species. Low rates of conversion can result in unwanted quantities of urea-formaldehyde species in a finished binder system. Lower moisture resistance and increased manufacturing emissions then result. Thus there is a strong desire to increase the conversion of urea to triazone such that almost pure triazone can be added to a phenol-formaldehyde or melamine-formaldehyde binder.

Skilled practitioners recognize that many forms of substituted triazone will not crosslink into phenol-formaldehyde or melamine-formaldehyde binders very well. In practice, amounts of cyclic urea prepolymer above 45% may give rise to poor rigidity and/or decreased moisture resistance.

It is an object of the present invention, therefor, to provide a triazone material which is more efficiently incorporated into a phenol-formaldehyde binder.

Another object of the present invention is to provide an improved binder for use in fiberglass insulations and glass mats having improved performance and cost. More particularly, it is an object to provide such a binder having improved high temperature applications.

Still another object of the present invention is to provide such improved binders exhibiting lower emissions of residual free monomers.

These and other objects will become apparent to the skilled artisan upon a review of the following description and the claims appended thereto.

SUMMARY OF THE INVENTION

The present invention achieves the foregoing objections in providing an improved binder for use in fiberglass insulations and glass mats having lower costs and improved performance. The chemistry of the present invention provides an increase in nitrogen content of the binders, while lowering costs. Simultaneously, the present invention provides binders having lowered emissions of residual free monomer from binders.

The process of the present invention comprises preparing a water soluble triazone material from three components: 1) urea, 2) formaldehyde, and 3) a primary amine or a mixture of a primary amine and ammonia. In addition, an alkali metal base or alkaline earth metal base may be added. Generally, an aqueous mixture is first prepared from urea, formaldehyde, and the amine. The pH can be adjusted with a base such that the mixture is basic with a pH generally above around 8.0. The mixture is then heated, preferably to around between 85 and 95° C., and held at that temperature until the reaction is complete.

Preferably, the urea formaldehyde amine ratio is 1:250–5:0.75–1.0, more preferably the ratio is 1:2.75–3.25:0.95–1.0, with a ratio of 1:3:1 being most preferred. Preferred primary amines are methyl amine, ethanol amine, and ethylene diamine. For diamines, the molar ratio is based on amine equivalence. In the case where an amine and ammonia mixture is used, it is preferred that the primary amine represents 40% or more of the molar nitrogen content of the mixture.

The resulting triazone material is useful as a binder in fiberglass insulations and glass mats. The materials are efficiently and cost effectively produced, and provide excellent performance, particularly in high temperature applications such as pipe insulations. The use of the binders also exhibit lower emissions.

DETAILED DESCRIPTION OF THE PREFERRED EMBODIMENTS

As described in the literature, triazones are prepared by the reaction of urea, formaldehyde, and a primary amine. The structure is shown below:

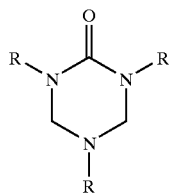

Such materials can be used as fertilizers, additives to resins for cost reduction purposes, or in textile treatments. The disadvantage of triazones known in the literature is that they often contain only about 50% (solids basis) of triazone, the balance consisting of hexamethylene tetramine (hexa) and low molecular weight urea formaldehyde species. Use of the latter components would give rise to poor fiberglass product performance, high emissions, and adverse product odor. The triazone materials of the present invention, however, overcome such problems and offer improved performance as binder materials.

The triazone materials useful in the binder systems of the present invention are formed from urea, formaldehyde, and a primary amine or a mixture of a primary amine and ammonia. In addition, an alkali metal base or alkaline earth metal base may be added. The formation of triazones preferably occurs in aqueous solutions, for example by the methods disclosed in U.S. Pat. Nos. 4,554,005; 4,778,510; and 6,114,491, which are hereby incorporated by reference in their entirety. It will be apparent to those skilled in the art that there are many suitable methods.

The mole ratio of the components used in preparing the triazone materials has been found to be very important in providing a material which has little or no residual monomer, thereby avoiding unwanted emissions, while also exhibiting good high temperature performance. Preferably the mole ratio of urea:formaldehyde:amine is 1:2.5–5:0.75–1.0. Most preferred is a ratio of 1:2.75–3.25:0.95–1.0 with a ratio of 1:3:1 being most preferred. Preferred primary amines are methyl amine, ethanol amine, and ethylene diamine. For diamines, the molar ratio is based on amine equivalence. In cases where amine and ammonia mixtures are used, it is preferred that the primary amine represents 40% or more of the molar nitrogen content of the mixture.

The preferred way of making the triazones involves charging a reaction vessel with urea, formaldehyde, and a primary amine. The order of addition is not critical but it is preferred to always maintain a basic pH during addition. This can be achieved through the use of a small amount of an alkali metal base or alkaline earth metal base solution. During charging of the reactants the temperature should be maintained below about 70° C., preferably below 60° C.

Once all of the reactants are charged, the resulting solution is heated to between 65 and 105° C., preferably between 85 and 95° C. That temperature is held until the reaction is complete, usually between 1 and 3 hours. Once the reaction is complete the solution is cooled to room temperature. The resulting solution shows exceptional storage stability at ambient conditions.

In the case of a urea:formaldehyde:amine ratio of 1:3:1, using a primary amine or diamine, the yield is usually about 100%.

Skilled practitioners in the art will recognize that the reactants are available in many forms. Any form that allows the reaction to proceed, and does not introduce undesirable impurities can be used. Also, the reactants can be added stepwise. For example urea and formaldehyde could be added together first and allowed to condense, forming low molecular weight species.

In situations where a primary amine and ammonia mixtures are used, it is preferred to add these stepwise. It is most preferred to add ammonia first. In such a case, ammonia would be reacted with the urea and formaldehyde until completion. The primary amine would then be added and reacted to completion. The preferred mole ratio of primary amine:ammonia is between 1:0 and 1:0.5.

The resulting triazone material can then be used with excellent results as a binder additive in fiberglass applications, particularly for fiberglass insulation and glass mats. The triazone modified binder can be applied using techniques conventional for phenol-formaldehyde binders. One particular application is pipe insulation, due to its high temperature requirements. The binder additive of the present invention has been found to surprisingly excel in such an application.

The following examples are provided in order to further illustrate the present invention and are not intended to be limiting in any way.

EXAMPLE 1

Four ammonia based triazones were prepared as summarized in Table 1. Analysis below shows that the highest urea conversion to triazone is 79.2%, and the highest ammonia conversion is 84.2%.

TABLE 1

Summary of Triazone Examples Given by Dupre et al in WO 99/32534

| Example | Urea | Formaldehyde | Ammonia | Triazone | Di/Tri Substituted Urea[1] | Mono Substituted Urea[1] | Free Urea[1] | Ammonia Utilization,[2] % |
|---|---|---|---|---|---|---|---|---|
| A | 1.0 | 2.0 | 0.5 | 42.1 | 28.5 | 24.5 | 4.9 | 84.2 |
| B | 1.0 | 1.2 | 0.5 | 25.7 | 7.2 | 31.0 | 35.2 | 25.7 |
| C | 1.0 | 3.0 | 1.0 | 76.0 | 15.3 | 8.1 | 0.6 | 76.0 |
| D | 1.0 | 4.0 | 1.0 | 79.2 | 17.7 | 1.6 | 1.5 | 79.2 |

[1]Percentages based on the initial charge of urea.
[2]Calculated from the data shown in the patent for the urea compounds.

For comparison, several triazones in accordance with the present invention were prepared using primary amines in place of ammonia. Analysis data for these triazones is summarized in Table 2.

TABLE 2

Summary of Primary Amine Based Triazones

| Sample | Amine[1] | Urea, moles | Formaldehyde, moles | Amine, moles | Free Amine, % | Free Urea, % | Triazone[2], % |
|---|---|---|---|---|---|---|---|
| 1 | EDA | 1.0 | 3.0 | 0.5 | n.d. | n.d. | >99 |
| 2 | EDA | 1.0 | 5.0 | 0.5 | 0.,03 | n.d. | >99 |
| 3 | EA | 1.0 | 3.0 | 1.0 | 0.68 | n.d. | >95 |
| 4 | EA | 1.0 | 5.0 | 1.0 | 0.02 | n.d. | >99 |

[1]EDA—ethylene diamine, EA—ethanol amine.
[2]Calculated from the amount of free amine remaining.

Comparison of the ammonia based triazones with those prepared from primary amines clearly shows that the triazone can be prepared in yields >95% when primary amines are used. Furthermore, the amount of unwanted free amine is <1%, contributing to very low emissions for the triazone materials of the present invention.

EXAMPLE 2

A pre-reacted binder system with a 40% urea extension was prepared from a 12% free formaldehyde phenol-formaldehyde resin. Dynamic mechanical analysis (DMA) testing was then carried out of this binder system with varying blends of triazones. Approximately 0.25 gram of binder was weighed out onto a strip of fiberglass filter paper. That sample was then heated at 3° C./min from ambient to 30° C. in a TA Instruments Model 2980 DMA. The samples stiffened during cure, which was complete by around 180° C. By measuring tan δ at 200° C. a measure of fully cured binder rigidity can be obtained. Tan δ is essentially a measure of molecular mobility in a material and is thus an indicator of how well a compound has reacted into a binder.

The binders were prepared as outlined in Table 3. The commercially available Georgia Pacific 458T95 material is believed to be an ammonia based triazone prepared in accordance with in U.S. Pat. No. 6,114,491. The tan δ values clearly show that significantly higher levels of the EDA triazone of the present invention can be incorporated into a binder than for the 458T95 material.

TABLE 3

DMA Data for Triazone Extended Binders

| Binder | Pre-React Ratio | Pre-React % | 458T95, % | EDA Triazone,[1] % | (NH4)2SO4, % | Tan δ, @ 210° C. |
|---|---|---|---|---|---|---|
| 1 | 60/40 | 100 | 0 | 0 | 4 | 0.0216 |
| 2 | 52.6/47.4 | 70 | 30 | 0 | 4 | 0.0750 |
| 3 | 43.5/56.5 | 55 | 45 | 0 | 4 | 0.2426 |
| 4 | 60/40 | 75 | 0 | 25 | 4 | 0.0284 |
| 5 | 60/40 | 50 | 0 | 50 | 4 | 0.0445 |
| 6 | 60/40 | 25 | 0 | 75 | 4 | 0.0581 |

[1]Prepared using a 1:3:0.5 molar ratio of urea:formaldehyde:amine.

EXAMPLE 3

A series of EDA based triazones were prepared using the reactant ratios indicated in Table 4. All were prepared using a 40% solids urea solution, 50% aqueous formaldehyde, and >99% solids ethylene diamine.

TABLE 4

| Urea | Formaldehyde | EDA | Product |
|---|---|---|---|
| 1 | 3 | 0.5 | Clear solution |
| 1 | 2.5 | 0.5 | Cloudy solution |
| 1 | 2 | 0.5 | Heavy precipitate |

The data clearly shows that clear solutions are only obtained for urea:formaldehyde:EDA rato of 1:>2.5:0.5.

While the invention has been described with preferred embodiments, it is to be understood that variations and modifications may be resorted to as will be apparent to those skilled in the art. Such variations and modifications are to be considered in the purview and the scope of the claims appended hereto.

What is claimed is:

1. A fiberglass binder comprised of a triazone material prepared from urea, formaldehyde and a primary amine, in a molar ratio of about 1:>2.5:0.5, respectively.

2. A fiberglass pipe insulation comprised of the binder of claim 1.

3. The fiberglass binder of claim 1, wherein the triazone material was prepared from urea, formaldehyde and either ethanol amine, methyl amine, or ethylene diamine.

4. The fiberglass binder of claim 1, wherein the binder comprises a urea containing phenolic resin and a triazone in the ratio of between 25/75 and 90/10.

5. The fiberglass binder of claim 4, wherein the triazone material was prepared from urea, formaldehyde and either ethanol amine, methyl amine, or ethylene diamine.

6. Fiberglass insulation comprised of the binder of claim 1.

7. A fiberglass mat comprised of the binder of claim 1.

8. An insulated pipe, wherein the insulation comprises the insulation of claim 2.

9. A triazone material prepared from urea, formaldehyde and a primary amine in the molar ratio of about 1:>2.5:0.5, respectively.

10. The triazone material of claim 9, wherein the primary amine comprises ethylene diamine.

11. The fiberglass binder of claim 1, wherein the primary amine comprises ethylene diamine.

* * * * *